US006615657B2

United States Patent
Hongerholt et al.

(10) Patent No.: US 6,615,657 B2
(45) Date of Patent: Sep. 9, 2003

(54) BUILT-IN TEST PROCEDURE FOR NON-INTRUSIVE ULTRASONIC LEVEL SENSING

(75) Inventors: Derrick D. Hongerholt, Eagan, MN (US); Eric D. Haugen, Farmington, MN (US); Charles G. Huss, Shakopee, MN (US); Greg A. Seidel, Eagan, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 0 days.

(21) Appl. No.: 09/754,795

(22) Filed: Jan. 4, 2001

(65) Prior Publication Data

US 2002/0083766 A1 Jul. 4, 2002

(51) Int. Cl.[7] .............................................. G01F 23/28
(52) U.S. Cl. .................................. 73/290 V; 73/290 R
(58) Field of Search .......................... 73/290 R, 290 V, 73/292, 291, 296

(56) References Cited

U.S. PATENT DOCUMENTS

| 4,366,839 A | * | 1/1983 | Salvin ................... 713/625.11 |
| 5,768,939 A | * | 6/1998 | Quayle et al. ............ 73/290 V |
| 5,987,994 A | * | 11/1999 | Maltby et al. ................ 73/646 |

* cited by examiner

Primary Examiner—Hezron Williams
Assistant Examiner—Rodney Frank
(74) Attorney, Agent, or Firm—Westman, Champlin & Kelly, P.A.

(57) ABSTRACT

A built-in test system for an ultrasonic liquid level sensor that includes a transducer assembly having an ultrasonic transducer, and a switch that will be actuated when the ultrasonic transducer is in intimate contact with a surface of a tank in which level is to be determined. Once the switch is actuated to indicate that the ultrasonic transducer is properly coupled to the surface, a test sequence is initiated to determine that the level of ultrasonic transmissions are above a certain desired threshold for a selected period of time, and after which the circuit looks for echoes to determine the depth of the liquid in the tank. Thereafter, the test sequence is repeated for each cycle of level sensing.

6 Claims, 2 Drawing Sheets

BUILT-IN TEST PROCEDURE FOR NON-INTRUSIVE ULTRASONIC LEVEL SENSING

BACKGROUND OF THE INVENTION

The present invention relates to sensing the level in a water tank on an aircraft, such as a drinking (potable) water tank on a commercial aircraft. The circuitry and control performs a test procedure at the start of each level sensing cycle to determine whether or not ultrasonic energy is being transmitted to the tank so that the measurement can be relied upon.

The use of ultrasonic sensors for determining liquid levels in various tanks is well known, in a general sense. In the case of the potable water tanks on aircraft, the level sensing is done at repeating cycles, and it is important to determine that the ultrasonic probe and associated circuitry is operating correctly when a water level is to be determined.

SUMMARY OF THE INVENTION

The present invention relates to a built-in or automatic test procedure for an ultrasonic sensor, designed specifically for potable water tanks on aircraft. The determination of water level using ultrasonic transducers is known. A burst of ultrasonic energy is output from the transmitter, and the transmitter is shut off. The time between the sending of the ultrasonic energy and the return of an echo is used to determine the level of the liquid in the tank.

The present invention includes a sensor assembly having a switch that is actuated when an ultrasonic transducer in the sensor assembly is physically and acoustically coupled to the tank surface to initiate a transmitter circuit.

The transmitter is excited with a high energy pulse. A portion of the acoustic energy generated by the transmitter is detected by the receiver before the energy ever leaves the transducer housing. This is referred to as internal ringing. If the internal ringing is above the detect threshold for a select period of time, the transmitter is determined to be operable.

The built-in test procedure is followed each time the level sensor cycle is started and repeated. The test procedure will indicate that the transducer is providing sufficiently high levels of energy for proper level sensing. Ultrasonic coupling between the ultrasonic transducer and tank is indicated when the microswitch is actuated.

Standard circuitry is utilized for the depth measurement, and is shown in block diagram form.

DETAILED DESCRIPTION OF THE ILLUSTRATIVE EMBODIMENTS

Figure 1:
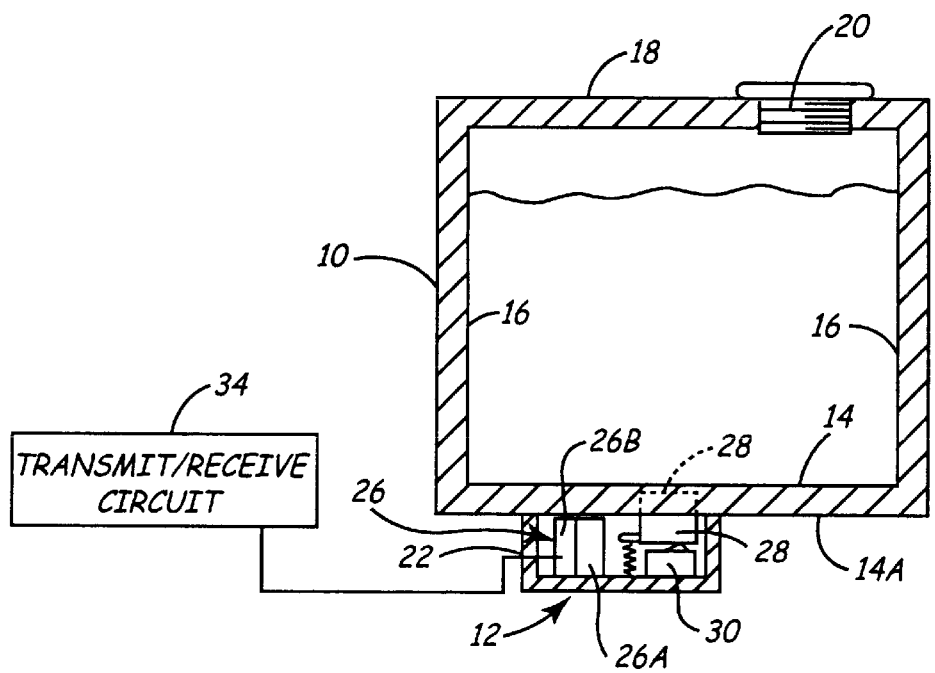
FIG. 1 is a schematic representation of a typical potable water tank having an ultrasonic transducer and components mounted according to the present invention associated therewith.

Referring to FIG. 1, schematically shown is a potable water tank 10 that is supplied with a level sensor assembly 12 on its bottom. The tank has a bottom wall 14, and side walls 16, and a top wall 18 with an inlet 20 for introducing water into the tank 10. The transducer assembly 12 is on the exterior of the bottom wall 14, and is held in place with a suitable clamp or frame 22, so that the transducer assembly 12 is in intimate contact with the bottom wall 14 on the exterior surface.

The sensor assembly 12 includes an ultrasonic transducer 26 which has a transmitter section 26A, which will put out bursts of ultrasonic energy under control, and a receiver section 26B for receiving reflected acoustic energy or echoes. Additionally, a spring loaded temperature sensor 28 is provided in the same frame or housing as the ultrasonic transducer 26. A microswitch 30 is mounted to be contacted and actuated by movement of the temperature sensor as the level sensor assembly seats on the tank. When the temperature sensor 28 is moved to actuate switch 30 it is known that ultrasonic transducer 26 is contacting an outer surface 14A of the tank. The ultrasonic transducer 26 is thus in contact with the outer surface 14A of the bottom wall 14 of the tank 10, when the microswitch 30 is actuated. The switch 30 can be either a normally closed or normally open switch and when actuated, it would be moved to the opposite state to provide a signal indicating that the temperature sensor 28 is in contact with the bottom surface 14A and thus indicating that the ultrasonic transducer 26 is also in contact with the surface 14A to provide ultrasonic coupling. The temperature sensor 28 is spring loaded so it will move to a dotted line position shown in FIG. 1, when the sensor assembly frame 22 is removed from the tank.

Figure 2:
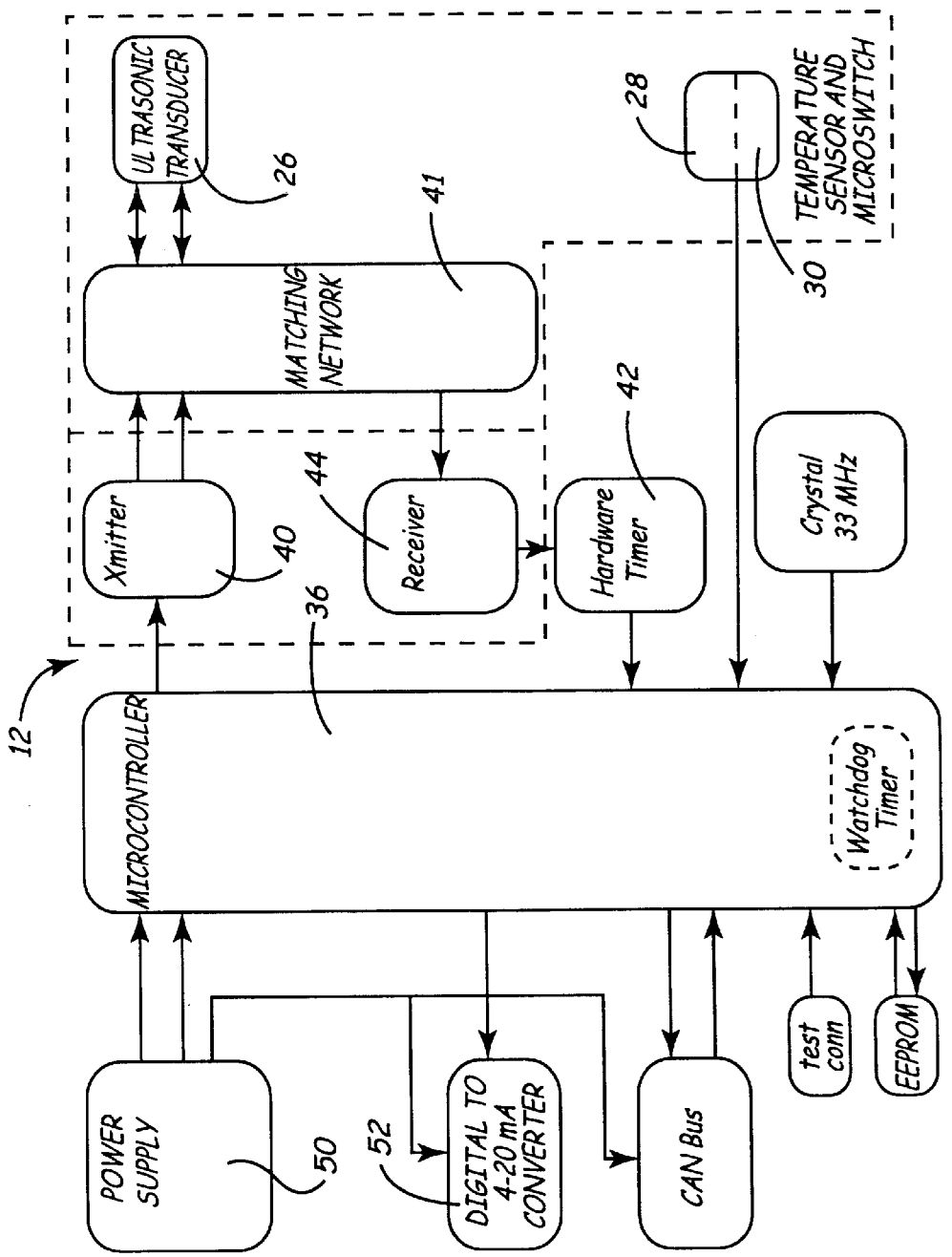
FIG. 2 is a block diagram of the level sensor circuitry used for the system of FIG. 1.

The temperature sensor 28, the microswitch 30 and the ultrasonic transducer 26 are all connected into a circuit 34, which is shown in greater detail in FIG. 2, where the components are illustrated. The circuit 34 concludes a conventional ultrasonic transmitter circuit 40 that will transmit ultrasonic pulses through the transmitter section 26A of the transducer 26 and a receiver circuit 44 connected to the receiver section 26B to receive return signals or echoes to determine the depth of liquid inside the tank 10. The ultrasonic transducer 26, the temperature sensor 28 and microswitch 30 are all part of the sensor assembly 12, and when the microswitch 30 is actuated, it indicates that the ultrasonic transducer 26 and the temperature sensor 28 are also in contact with the surface 14A. This sends a signal to a microprocessor 36 in the circuitry 34, which is a central control and includes the necessary memory that is programmed to provide the output desired. The microprocessor or microcontroller 36 includes software that responds to the operation of the microswitch 30, to initiate the ultrasonic transducer program, during each cycle of operation.

The ultrasonic transducer 26 is on continuously, during aircraft operations, and goes through a set sequence. The first step is to determine whether or not the microswitch 30 has been actuated, which is necessary for any functioning of the tank level sensor assembly. If switch 30 has not been actuated an error flag will be generated indicating that the sensor assembly 12, and thus the ultrasonic transducer 26, is not properly coupled to the tank 10. No level reading is taken if microswitch 30 is not actuated.

If the microswitch 30 is closed (actuated), the ultrasonic transducer 26 is properly coupled to the tank, the control software will start the test routine. The transmitter circuit 40 in the transmitter section will be operated at a low power level in the test sequence to determine whether or not ultrasonic energy is being transmitted by the transmitter section 26A of transducer 26. An internal timer 42 shown in FIG. 2 is used for timing the functions. The transmitter circuit 40 is interfaced with the transmitter section 26A of the ultrasonic transducer and will provide a pulse output through the ultrasonic transducer 26 to the tank 10.

Figure 3:
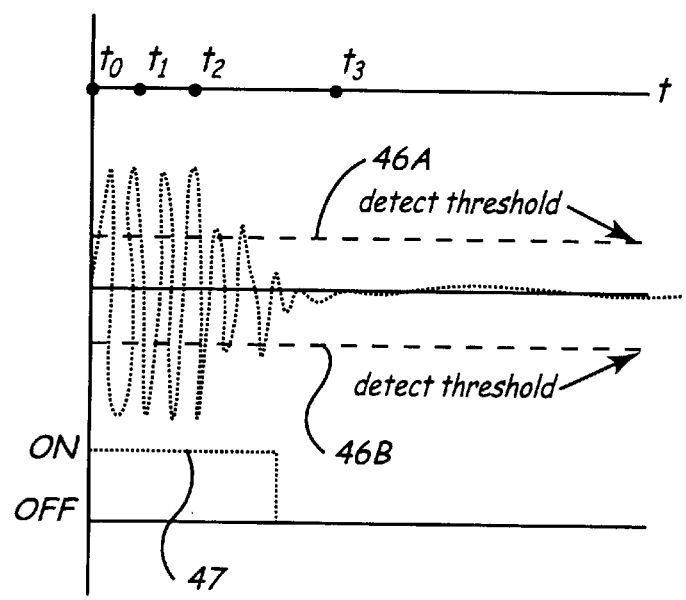
FIG. 3 is a timing diagram illustrating the built-in test procedure functions.

Referring to FIG. 3, the timing diagram, the time $t_0$ is the start of the initial transmission which is commenced in each cycle, when it is determined that the microswitch 30 is actuated. The transmitter circuit 40 will transmit ultrasonic energy through the transducer transmitter section 26A. A receiver circuit 44 for receiver section 26B is of conventional design, and will recognize this initial output as a "ringing". If the received pulses have an output voltage greater than threshold levels indicated at 46A and 46B in FIG. 3 proper operation is indicated.

Between time $t_1$, when the high voltage output is detected, and time $t_2$, which is when the software stops monitoring the detect line, if the receiver circuit 44 indicates that the voltage is high, that is, there is a "ringing", the built-in test procedure for determining that there is an ultrasonic energy output indicates acceptable operation. A detect signal 47 is present or on when the output is greater than the threshold level and is off when the signals are less than the threshold level. At time $t_3$ the software activates the receiver circuit 44 to detect a return echo.

From $t_3$ to the end of each cycle, detecting return echoes would be accomplished in a conventional manner to determine the level of the liquid in the tank 10. The built-in test procedure is performed at the start of each cycle, and the repetition of the cycle of test and level sensing is in the range of 20 times a second. The cycle is continuous when the detection of level is undertaken. If the ultrasonic transducer 26 loosens from its intimate contact with the surface 14A, the microswitch 30 would go to a state indicating that the transducer was no longer in contact with the surface, and the test and level detecting operation would stop, and an error flag produced. An alarm also could be sounded. Additionally, if the ultrasonic transducer itself fails, it would not provide an output that would pass the test between times $t_1$ and $t_2$, as shown in FIG. 3, and this could also produce an error flag.

FIG. 2 also shows that a power supply 50 is used, and if desired a circuit 52 may be provided to convert the outputs to analog outputs provided to a standard 4 to 20 mA, two wire control circuit. The built-in test procedures also can be used with other pulse type transmitters, such as magneto strictive sensors, which send a torsion pulse along a rod, and which receive a return pulse caused by a magnet on a float that rises and falls with liquid level.

The ultrasonic transducer used with the present invention may be one made by Etalon, Inc. of Lebanon, Ind., USA.

Although the present invention has been described with reference to preferred embodiments, workers skilled in the art will recognize that changes may be made in form and detail without departing from the spirit and scope of the invention.

What is claimed is:

1. An ultrasonic liquid level sensor for determining levels of liquid in a tank during repeating cycles of operation and having a self test circuitry for determining operability of the sensor at a start of each cycle, comprising a sensor assembly including an ultrasonic transducer, and a switch, said sensor assembly adapted to be coupled to the tank in physical contact therewith, and the switch being positioned on the sensor assembly to be operated only when the ultrasonic transducer is in intimate contact with a surface of the tank, the ultrasonic transducer including a circuit having a transmitter for providing pulses of ultrasonic energy from the transducer for a first time period of ultrasonic energy transmission after initiating the pulse of ultrasonic energy at the start of each cycle, a receiver circuit for determining output levels of the ultrasonic energy transmissions during the first time period, a circuit for determining that the receiver circuit output levels are above a selected threshold level for a second selected period of time after the transmitter has initiated the pulses to start a cycle, and a control circuit for turning off the pulse of ultrasonic energy, subsequent to the second period of time, the receiver circuit thereby detecting return pulses from a level of liquid in the tank subsequent to the second period of time during each cycle of operation.

2. The ultrasonic liquid level sensor of claim 1 and a temperature sensor in the transducer assembly positioned to be in contact with the tank when the switch is actuated.

3. An ultrasonic liquid level sensor for determining levels of liquid in a tank, comprising a sensor assembly including an ultrasonic transducer, a circuit for operating the transducer, and a switch coupled to the circuit to provide a signal when the sensor assembly is positioned against a tank surface, said circuit having a transmitter capable of providing a pulse of ultrasonic energy from the ultrasonic transducer in repeating cycles when the switch is closed, and a receiver circuit for determining output levels of transmitted ultrasonic energy, and after a time period subsequent to transmission of a pulse of ultrasonic energy at the start of each cycle, the receiving circuit determining levels of signals of reflected ultrasonic energy from a surface of the liquid in such tank to establish a level of liquid, a timer coupled to the receiver circuit, the receiver circuit providing output signals at levels relative to the transmitted pulses, and indicating when transmitted pulses are above a threshold level at a time before receiving reflected ultrasonic energy signals, and the timer determining that the output signal levels are above the threshold level for a selected timer period after initiation of a transmitted pulse at each of the repeating cycles, and before the receiver circuit receives signals of reflected ultrasonic energy to indicate transducer operability.

4. The ultrasonic liquid level sensor of claim 3, wherein the timer is initiated each time the ultrasonic transducer is energized to transmit pulses.

5. An ultrasonic liquid level sensor for determining levels of liquid in a tank, comprising a sensor assembly including an ultrasonic transducer, a circuit for operating the transducer, said circuit having a transmitter capable of initiating transmitting pulses of ultrasonic energy from the ultrasonic transducer, each of the pulses terminating after a first transmitter time period subsequent to initiation of pulse transmission, and ultrasonic energy based on the initiated pulses being reflected from a surface of liquid in the tank to the transducer after the first time period, the transducer including a receiver circuit for determining output levels of transmitted ultrasonic energy, and, after the first time period, levels of reflected ultrasonic energy, and a timer coupled to the receiver circuit, the receiver circuit providing output signals at levels which are a function of energy of the transmitted pulses during the first time period, wherein output signal levels above a selected threshold signal level for a selected second time period after initiation of transmitted pulses indicate operability of the ultrasonic transducer.

6. The ultrasonic liquid level sensor of claim 4 wherein the transmitter operates to initiate transmitted pulses at the start of a series of first time periods and the timer is initiated to provide a second time period during each first time period of the transmitter.

\* \* \* \* \*